United States Patent [19]
Holcomb

[11] 3,873,019
[45] Mar. 25, 1975

[54] CONTROLLING AND RECORDING FUEL DISPENSING

[75] Inventor: Daniel C. Holcomb, Raleigh, N.C.

[73] Assignee: CH Electronics, Inc., Raleigh, N.C.

[22] Filed: Mar. 15, 1973

[21] Appl. No.: 341,615

[52] U.S. Cl........ 235/92 CT, 235/92 R, 235/93 FL, 235/61.8 A
[51] Int. Cl............................................ G06m 3/12
[58] Field of Search....... 235/92 CT, 92 FL, 92 AC, 235/61.8 A

[56] References Cited
UNITED STATES PATENTS

| | | | |
|---|---|---|---|
| 3,199,729 | 8/1965 | Samp | 235/92 FL |
| 3,551,652 | 12/1970 | Faude | 235/92 CT |
| 3,609,300 | 9/1971 | Halpern | 235/61.8 A |
| 3,670,924 | 6/1972 | Asper | 235/61.7 B |
| 3,678,253 | 7/1972 | Johnston | 235/92 FL |
| 3,779,357 | 12/1973 | Haller | 235/92 FL |

*Primary Examiner*—Gareth D. Shaw
*Assistant Examiner*—Robert F. Gnuse
*Attorney, Agent, or Firm*—A. Yates Dowell, Jr.

[57] ABSTRACT

A self-service dispensing system for vending discrete products and variable quantities of fungible commodities is disclosed. The system comprises a plurality of vending units, some adapted to dispense the discrete items, such as candy and cigarettes, and others adapted to dispense desired quantities of commodities such as gasoline. Customers are provided with a tally key module, which, when inserted into a vending unit, activates the vending unit to dispense the desired product and record on its face the value of the product dispensed. If further products are desired, the tally key may be used repetitively, recording on its face the total value of products vended. The tally key module also activates an electronic security lock system in the machine.

In the case of a vending unit which dispenses selected discrete items, selection of a product produces in the vending unit circuitry a binary coded word assigned to the product which is sent to a plurality of data selectors which are programmed with price information. The outputs of the data selectors are used to reset a binary down counting circuit with a number representing the price. A clock is then activated and sends pulses to the binary down counting circuit and the tally key module, causing the tally key module to tally the price on a mechanical register and the counting circuit to count down to the number that it was initially set to. As soon as the price is set in the counting circuit, a solenoid is activated which inserts a pin into the module, preventing it from being released until the counting is completed. When the counter has counted down to its original set position, the clock is disabled and the pin is removed from the module which now has the price of the product purchased registered on its face. Selecting another product will repeat the process, advancing the mechanical register and thus causing the register to display the total.

In the case of a vending unit which dispenses variable quantities of a fungible item, activation of the unit results in the unit's generating a series of timed pulses whose total number is representative of the quantity and price of the produce vended. These pulses are also sent to the tally key module, causing it to advance and record the value of the product furnished.

3 Claims, 3 Drawing Figures

3,873,019

CONTROLLING AND RECORDING FUEL DISPENSING

BACKGROUND OF THE INVENTION

With the growing importance of automatic product dispensing systems, a need has arisen for vending systems to serve in various specialized applications. The present invention is concerned with a system where a tally key module is used to activate a selected vending machine and record the price of products purchased on its face. The customer, when he enters the store, is given the tally module which he uses to make his purchases, and, upon leaving the store, is charged the amount displayed on the face of the module.

Although the use of tally key modules to activate product dispensing machines and record the products purchased are known (see for example U.S. Pat. No. 3,551,652), these prior art devices suffer from a number of serious inadequacies.

The prior art devices generally exhibit inflexibility in the number of different items that may be accommodated and the prices that may be charged for the items. Recording is, in general, of the number of items purchased and not of the total price of the items. For this reason, if one desired to dispense a plurality of different items at a plurality of prices, it was necessary to maintain a number of machines. Furthermore, in the event that one wanted to change the prices of items, the inflexibility of the machines made this a difficult and time consuming, if not impossible task.

SUMMARY OF THE INVENTION

In accordance with the present invention, a dispensing system is provided in which a plurality of products can be sold at a plurality of prices. In the preferred embodiment, the price of discrete products is adjustable over a predetermined range in multiples of a predetermined minimum value. When it is desired to purchase a product, the tally key module is inserted into the vending unit and the machine activated for the dispensation of the desired products. The total value of goods purchased is recorded on the face of the tally key module. Recording on the face of the tally key module is actuated by a pulse generating circuit in the vending unit. In order to insure that the full price will be recorded on the counter, a solenoid is provided to insert a pin into the module to keep it from being pulled out before the tallying has been completed.

In the discrete product dispensing unit, price information is stored in a plurality of binary coded decimal (BCD) switches and a plurality of SPST switches. One BCD switch and one SPST switch is assigned to each of the products to be dispensed. The BCD switch stores price information in increments of 10 cents and the SPST switch stores an additional increment of five cents.

Each of the BCD switches has four outputs which represent 10, 20, 40 and 80 cent value units in the price of the item to which it is assigned. The four outputs are selectively connected to a grounded common pole and, as the switch is rotated, the sum of the values represented by the outputs connected to the common pole is equal to the total value of 10 cent increments in the price of the item to be dispensed. The number of 10 cent increments in the price of the item is indicated on the face of the BCD switch. The addition of 5 cents to the price is accomplished by simply closing the SPST switch.

The outputs of each of the BCD switches is then selectively sent via a plurality of data selectors to corresponding stages of a binary down counting circuit along with the output of the corresponding SPST switch. This effectively sets the counting circuit to a binary number which represents the value of the selected item. A clock is now enabled and it pulses the counting circuit, causing it to count down and reach the state which represents zero stored value. At the same time that the pulses are being sent to the counting circuit, pulses are also being sent to a register on the tally module which is registering the number of pulses and thus the price of the item. Of course, the price is registered on the tally module because the number stored in the counting circuit is proportional to the price, and the number of pulses sent to the counter to cause it to reach the zero value state is proportional to the number stored in the counter. When the counting circuit reaches the zero value state, the clock is disabled and the machine is ready to accept another product selection, or alternatively, the tally key module could be removed and used in another vending unit. The present invention can most easily be incorporated into existing vending facilities by simply adding the control circuitry to existing machines, such as machines which vend a plurality of products in response to the closing of an electrical push-button switch.

In the fungible item dispensing unit, activation of the unit results in the unit's generating a series of pulses whose total number is representative of the quantity and price of the product vended. These pulses are also sent to the tally key module causing it to advance and add the price of the products selected to the total displayed on its face.

It is an object of this invention to provide a product dispensing system capable of vending selected discrete items as well as desired quantities of fungible products.

It is another object of this invention to provide a vending system in which the price of dispensed items can be most conveniently set.

It is a further object of this invention to provide a vending system in which the total value of the products dispensed is recorded on tally key module.

It is still a further object of this invention to provide a product dispensing system with a security mechanism to prevent unauthorized use.

DETAILED DESCRIPTION OF THE PREFERRED EMBODIMENT

Figure 1:
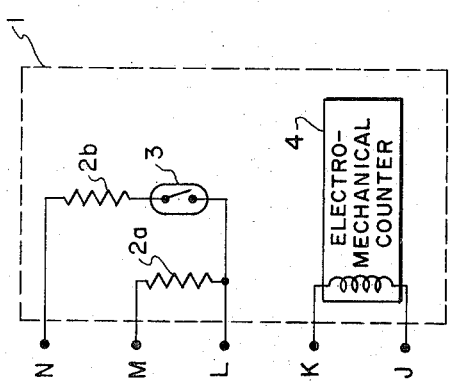
FIG. 1 is a schematic diagram of a tally register module constructed in accordance with the present invention.
Figure 2A:
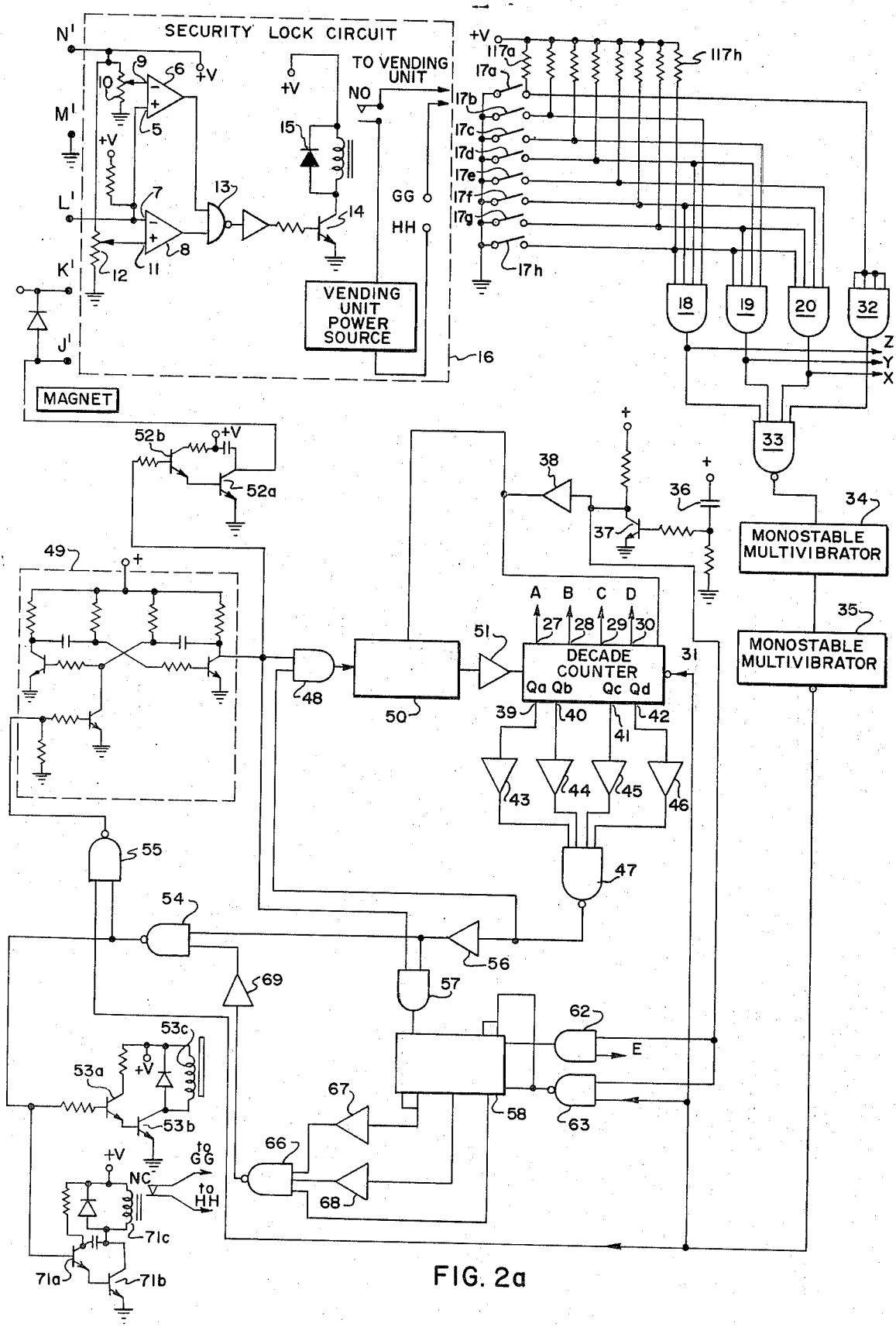
FIGS. 2a and 2b joined at points X—X', Y—Y' and Z—Z' together form a schematic diagram of a discrete item dispensing unit for use in conjunction with the module illustrated in FIG. 1.
Figure 2B:
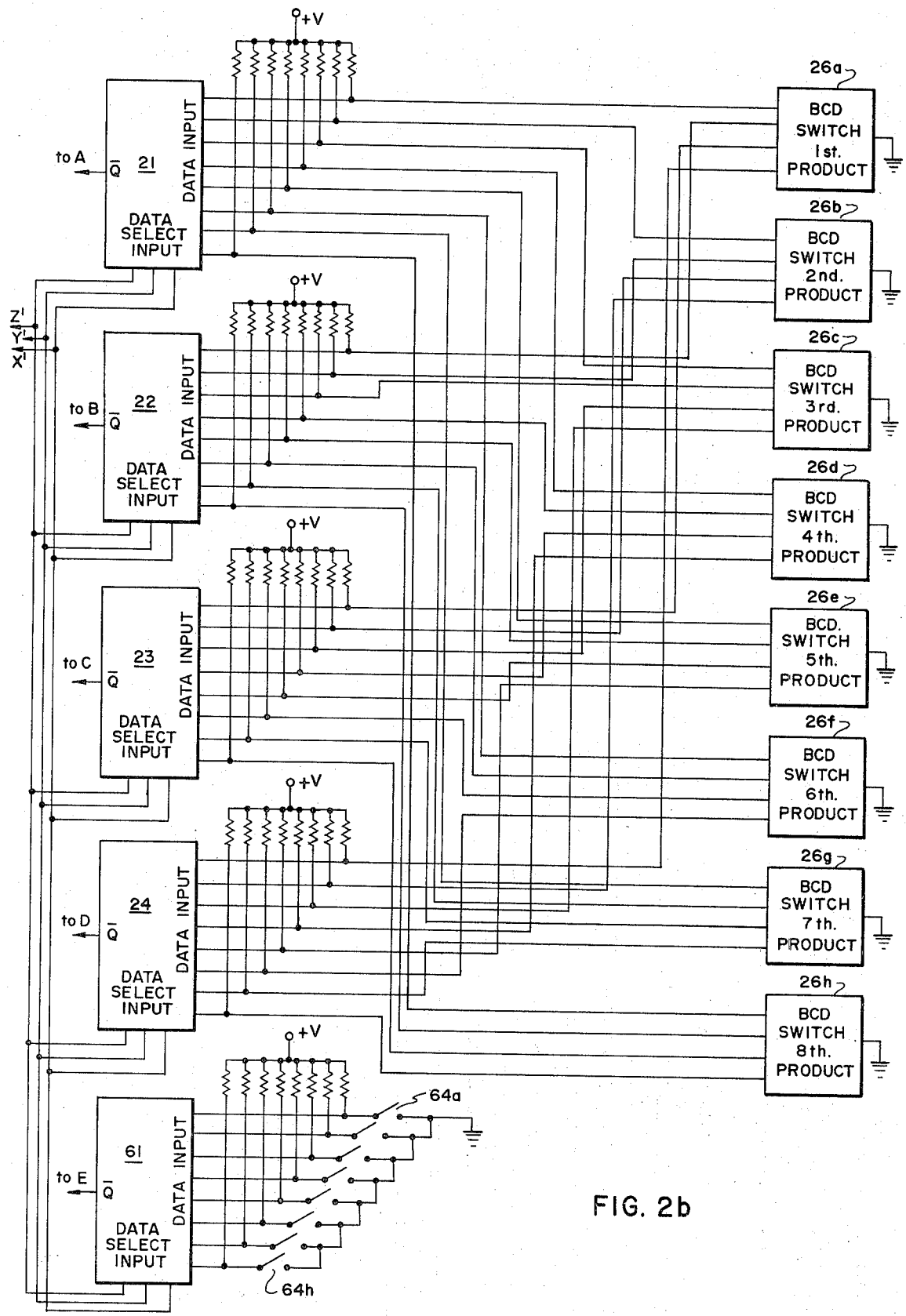

As illustrated in FIG. 1, the tally module 1 is of very simple design, containing only a pair of precision resistors 2a and 2b, a magnetic reed relay 3, and a tally register 4. Upon insertion of the tally module 1 into the discrete item vending unit, illustrated in FIGS. 2a and 2b, contacts J, K, L, M and N of the module 1 mate with contact J', K', L', M' and N' on the vending units. At the same time, a magnet in the vending unit closes reed relay 3 which serves as an added security device. Terminal M is then grounded and terminal N is then connected to the positive supply voltage +V. Resistor 2a and resistor 2b then act as a voltage divider and apply a voltage to the positive input 5 of differential amplifier 6 and the negative input 7 of differential amplifier 8. Differential amplifiers 6 and 8 act as a security locking circuit. Amplifier 6 compares the voltage present at the output L of the voltage divider to see that it is greater than the voltage presented to input 9 of amplifier 6 by resistor 10, producing a logical 1 if that is the case. Amplifier 8 compares the voltage present at the output L of the voltage divider to see that it is less than the voltage presented to input 11 of amplifier 8 by resistor 12, producing a logical 1 if that is the case. A reed relay switch is in series with resistor 2 for added security. Proper adjustment of resistors 10 and 12 insures that only a tally module with the proper ratio of resistance it will produce logical 1 outputs from both amplifiers 6 and 8 and a corresponding logical 0 output from NAND gate 13. A logical 0 from gate 13 causes transistor 14 to conduct, activating normally open relay 15 and applying the supply voltage to the vending unit. In this manner, only a user with a tally key module can activate the vending unit and purchase desired products. The vending unit can be a conventional electrical vending machine with a plurality of electrical push-button switches on its face, modified with the control system of the present invention.

Once power has been applied to the vending unit, it is ready to receive selections of various products. In describing the preferred embodiment of the discrete item vending unit, we will refer to a machine in which the least expensive item costs 5 cents and all items cost multiples of 5 cents. It is, of course, understood that the principles of the invention are in no way limited to such a choice. We will describe such a machine only in order to describe a particularly useful embodiment of the invention and make most clear the general concept of the invention through a specific illustration. When it is desired to select a product, the appropriate switch from the group of switches 17 a–h is closed. In the preferred embodiment, switches 17 a–h are activated simultaneously with the electrical push-button switch which causes the machine to release the product. This can most easily be accomplished by the use of a DPST electrical push-button switch with one set of contacts used for product dispensing and the other as one of the switches 17 a–h. Each of the switches 17 a–h is assigned to a product. Closure of any one of the switches 17 a–h causes a different combination of AND gate outputs thus providing a different digital code for each product. For example, closure of 17a causes gates 18, 19 and 20 to have logical 1 outputs, while closure of 17b causes only gates 19 and 20 to have logical 1 outputs. Unless grounded by one of the switches 17 a–h, the gate inputs are biased up by resistor 117 a–h. The outputs of these three gates are then sent to line data selectors 21, 22, 23, 24 and 61. These data selectors are standard integrated circuit packages such as the type 74151 manufactured by the Signetics Corp. of Sunnyvale, Calif.

Each of these data selectors 21–24 represents a value. Selector 21 represents the value of 10 cents; selector 22 represents the value of twenty cents; selector 23 represents the value of 40 cents; and selector 24 represents the value of 80 cents. These values correspond to the powers of two multiplied by 10 cents. Price information for each of the products is fed to the selectors by Binary Coded Decimal switches 16 a–h which may be of any suitable type such as the 6000 series marketed by Amp, Inc. of Harrisburg, Pa. Dependent upon which of the switches 17 a–h was pressed, the proper values are then present at the data inputs 27–30 of decade counter 31 although they are not yet loaded. In such a manner, any value up to 90 cents can be stored in the counter. Decade down counter 31 is an integrated circuit such as the Signetics type 74192B. The power is kept on in the control circuit so that it can accept the tally register. When the machine or vending unit is initially turned on, capacitor 36 appears as a short circuit and causes transistor 37 to short out, thus applying a logical 0 to inverter 38 which provides the "clear" inputs of counters 31 and 50 with a logical 1. This constrains all the outputs 39, 40, 41 and 42 of the counter 31 to be logical 0 and the outputs of the inverters 43, 44, 45 and 46 to be logical 1. This makes the output of NAND gate 47 logical 0. The output of gate 47 is then sent to AND gate 48, which because of the logical 0 output of gate 47 will not pass clock pulses from clock 49. The clock is enabled by NAND gates 54 and 55. Gate 54 also drives transistor 53a and 53b causing activation of solenoid cartridge pin lock 53c when the tally module has been inserted and a selection made. Activation of lock 53 prevents removal of the tally module until tallying has been completed. Gate 54 also drives transistors 71a and 71b causing activation of normally closed relay 71c, thereby opening its contacts and disabling the machine from dispensing further items until counting has been completed.

When one of the switches 17 a–h is closed, at least one of the previous all logical 1 outputs of gates 18, 19, 20 and 32 is changed. For example, if switch 17a is closed, gate 32 changes its output from logical 1 to logical 0. As soon as the output of one of the gates 18, 19, 20 or 32 changes from logical 1, the output of NAND gate 33 changes to logical 1. This triggers monostable multivibrator 34 which provides a delay of 5 to 10 milliseconds to allow switching transients to subside. Monostable multivibrator 34 then triggers monostable multivibrator 35 which sends a negative pulse to the "load" input of counter 31 causing the outputs of data selectors 21–24 to be loaded into counter 31.

As soon as this information is loaded into counter 31, its outputs are logical 1, and AND gate 48 is no longer disabled. The output of gate 56 is then logical 0; the output of inverter 55 is also logical 0; and, the output of gate 54 is logical 1. The output of gate 55 then enables the clock, and gate 48 passes pulses to divide-by-10 counter 50, which may be any suitable kind such as the Signetics N7490B, and inverter 51 which drives down decade counter 31. Simultaneously the pulses are sent via transistors 52a and 52b to the coil of the register 4 in the tally module. Register 4 is a simple electromechanical counter that records the number of pulses that it received on its face. Since the register 4 will record 10 pulses for every pulse that down decade counter 31 receives, and the number in the decade counter represents the value of the item dispensed divided by 10, it is seen that when the down decade counter reaches its all logical 0's output, the register has recorded the 10 cent increments in the price of the item dispensed. Of course, once the counter 31 has all logical 0's in its output, gate 48 will again be disabled and will cease to pass pulses to the counter.

At the same time that gate 48 is disabled by an all 0's output from counter 31, the output of gate 47 is sent via inverter 56 to AND gate 57, which is thereby enabled and passes the clock pulses to decade counter 58, which may be of any suitable type such as the Signetis N7490A.

In the event that 5 cents is to be added to the price already registered, counter 58 has been initially set to the number 9 by the output of data selector 61 and multivibrator 35, via AND gate 62 and NAND gate 63. The output of gate 62 is connected to one of the reset 9 inputs of the counter. The output of gate 63 is connected to the other reset 9 input and the two reset 0 inputs of the counter. This has the effect of loading the number 9 in digital form into counter 58 if it is desired to include the 5 cent increment in the price of the item vended.

Inclusion of the 5 cent increment in the price of an item is effected by closing the SPST switch from the group consisting of switches 64 a–h which is assigned to the particular item.

In the counting of the 5 cent increment, counter 58, which is initially set to the number 9, receives 5 pulses from gate 57. Simultaneously, the tally register 4 also receives 5 pulses causing it to add 5 to the total displayed on its face. As soon as 5 pulses have been counted, the counter 58 is then storing the number 4 in digital form. Its Q1, Q2 and Q3 outputs which are coupled to NAND gate 66 and inverters 67 and 68 which, in turn, are coupled to gate 66, cause gate 66 to change its output. Gate 66 then drives inverter 69 and gates 54 and 55. Gate 55 then disables the clock and stops the counting operation. Gate 54 simultaneously disables solenoid cartridge pin lock 53c and the machine inhibit circuitry.

Figure 3:
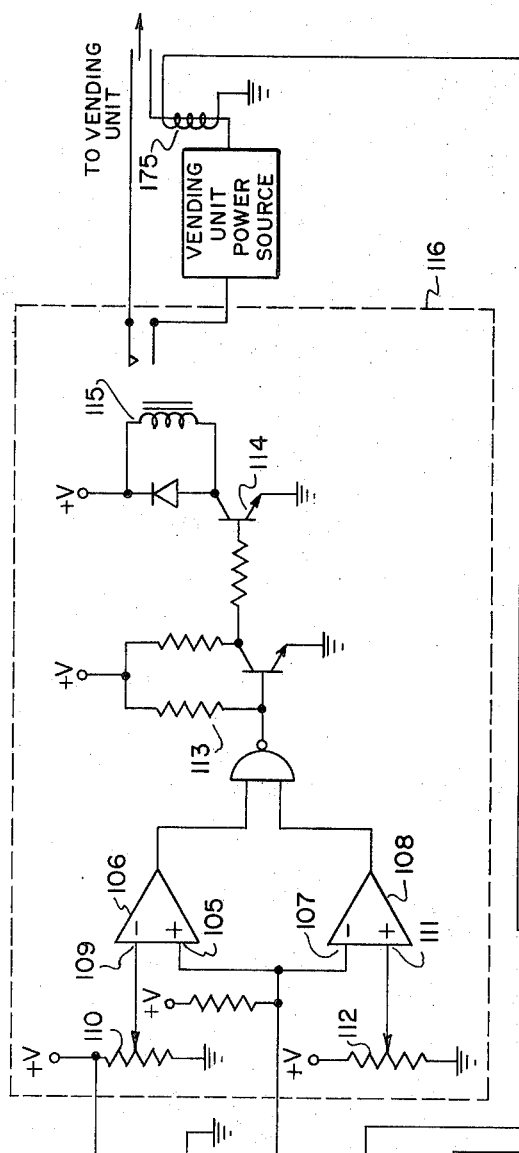
FIG. 3 illustrates a fungible product dispensing unit for use in conjunction with the tally module illustrated in FIG. 1.
Figure 3:
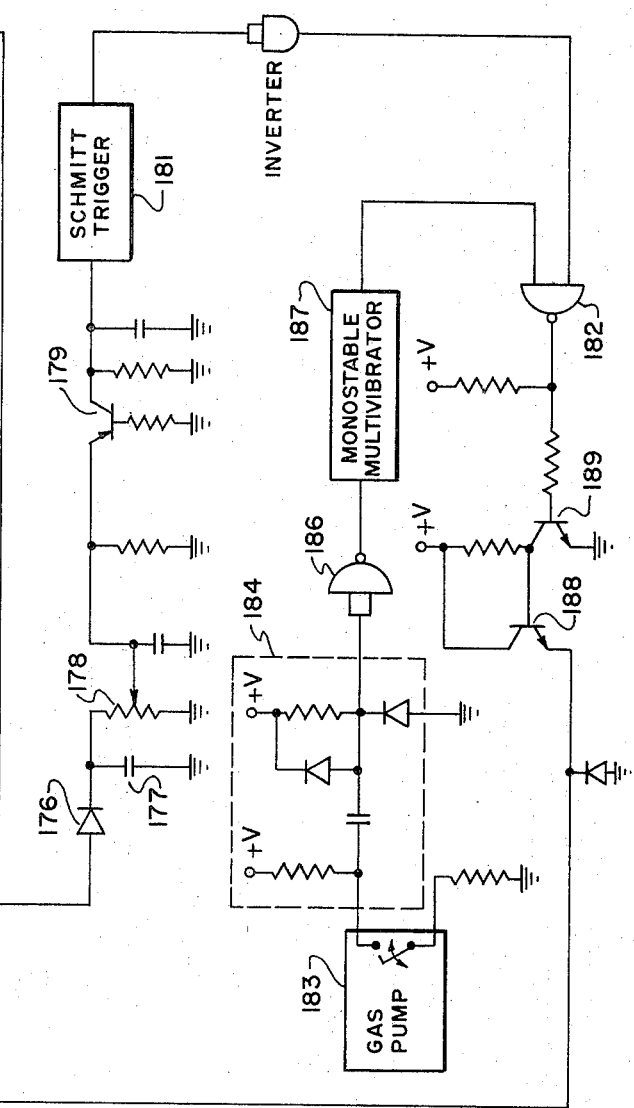

Referring to FIG. 3, we have a schematic illustration of the fungible product vending unit. The operation of security lock circuit 116 is identical to the operation of security lock circuit 16 in the discrete item vending unit with similarly numbered parts performing identical functions. The unit illustrated in FIG. 3 also accepts the same tally register module illustrated in FIG. 1.

A current sensing transformer 175 is coupled to the line from the vending unit power source which has current flowing in it when the security lock circuit has been activated. The detected A.C. current is then rectified by diode 176 and filtered by capacitor 177. Potentiometer 178 is adjusted to cause transistor 179 to conduct only when current is sensed. Transistor 179 drives Schmitt Trigger 181 which produces a logical 1 when transistor 179 is conducting. Schmitt Trigger 181 produces a stable signal and insulates NAND gate 182 from any noise present at the output of transistor 179.

The invention may most advantageously be used in conjunction with a dispensing machine of the conventional kind, such as gas pump 183. Pump 183 has a metering mechanism which produces periodic signals as gas is pumped. These signals are coupled to filter 184 which supplies pulses to NAND gate 186 which in turn drives monostable multivibrator 187. Multivibrator 187 drives NAND gate 182, which, in response to the periodic signals from the pump and the presence of power flowing to the pump, produces electrical pulses which are coupled to transistor 188 via transistor 189. These pulses then advance the tally register 4 as the product is dispensed, thus recording on the face of the module the value of the product vended.

I claim:

1. In a machine for dispensing discrete products in response to the activation of product selection means, the improvement comprising:
   a. means for generating a binary word identifying a dispensed product in response to the activation of its associated selection means;
   b. a counter;
   c. clock means responsive to said generating means to deliver a series of electrical pulses;
   d. storing means for storing preset price information related to each of said selectable products;
   e. data selector means for setting related price information into said counter as a digital number in response to said binary word;
   f. means for gating said series of pulses from said clock into said counter whereby the digital number stored in said counter is varied in response to said pulses until said counter reaches a predetermined number;
   g. means for disabling said clock means in response to the presence of said predetermined number in said counter;
   h. tally module means insertable into the machine and when inserted enabling said selection means, and said module means including register means coupled to said clock means to receive said series of pulses and tally a number proportional to the price of the products, and said module means further including programmable security means comprising a preset electrical network;
   i. said machine further including means cooperative with said security means and comprising amplifier means cooperative with said electrical network for detecting a properly programmed module means and operative to deliver an enabling signal to activate the machine and allow it to dispense products while a properly programmed module is inserted, whereby unauthorized operation of the said machine is prevented when the module means is withdrawn; and
   j. lock means operative in response to the selection of a product to prevent withdrawal of the inserted module means until the complete series of pulses has been tallied in the module means.

2. In a machine for dispensing discrete products in response to the activation of product selection means, the improvement comprising:
   a. means for generating a binary word identifying a dispensed product in response to the activation of its associated selection means;
   b. a counter;
   c. clock means responsive to said generating means to deliver a series of electrical pulses;
   d. storing means for storing preset price information related to each of said selectable products;
   e. data selector means for setting related price information into said counter as a digital number in response to said binary word;
   f. means for gating said series of pulses from said clock into said counter whereby the digital number stored in said counter is varied in response to said pulses until said counter reaches a predetermined number;

g. means for disabling said clock means in response to the presence of said predetermined number in said counter;

h. tally module means insertable into the machine and when inserted enabling said selection means, and said module means including register means coupled to said clock means to receive said series of pulses and tally a number proportional to the price of the products;

i. lock means operative in response to the selection of a product to prevent withdrawal of the inserted module means until the complete series of pulses has been tallied in the module means; and j. means for preventing the activation of said selection means until said clock has ceased producing pulses.

3. In a machine which dispenses desired quantities of fungible product in response to the activation of a mechanical member and which produces periodic signals in response to the dispensing of said fungible product, the number of said periodic signals being proportional in amount to the amount of the product dispensed, the improvement comprising means for detecting said periodic signals, means for detecting the operation of the machine, means for producing a series of pulses in response to said periodic signals and continuing as long as operation of the machine is detected, and tally module means removably insertable into the machine and including register means responsive to said pulses for recording a number proportional to the number of pulses, said module means further comprising pre-programmable security means including a preset electrical network, and the machine further comprising amplifier means cooperative with said electrical network and operative when a module means is inserted for detecting a properly programmed module means and delivering an enabling signal to activate said machine allowing it to dispense said fungible product.

* * * * *